United States Patent
Jordan et al.

(10) Patent No.: US 6,431,816 B1
(45) Date of Patent: Aug. 13, 2002

(54) ADAPTIVE LOAD-CLAMPING SYSTEM

(75) Inventors: Dean Clark Jordan, Gresham, OR (US); Richard D. Seaberg, Brush Prairie, WA (US)

(73) Assignee: Cascade Corporation, Fairview, OR (US)

(*) Notice: Subject to any disclaimer, the term of this patent is extended or adjusted under 35 U.S.C. 154(b) by 172 days.

(21) Appl. No.: 09/168,358

(22) Filed: Oct. 7, 1998

(51) Int. Cl.[7] ............................................... B66F 9/24
(52) U.S. Cl. ......................................... 414/636; 414/642
(58) Field of Search ............................ 414/621, 629, 414/636, 642

(56) References Cited

U.S. PATENT DOCUMENTS

| | | | |
|---|---|---|---|
| 2,603,368 A | * 7/1952 | Vance | 414/636 X |
| 3,438,308 A | 4/1969 | Nutter | |
| 3,904,234 A | 9/1975 | Hill et al. | |
| 3,905,635 A | 9/1975 | Esser | |
| 4,093,091 A | * 6/1978 | Gregg et al. | 414/642 |
| 4,093,092 A | * 6/1978 | Habinger et al. | 414/642 X |
| 4,491,918 A | * 1/1985 | Yuki et al. | 414/636 X |
| 4,516,905 A | * 5/1985 | Cavin et al. | 414/621 X |
| 4,517,645 A | * 5/1985 | Yuki et al. | 414/636 X |
| 4,605,354 A | 8/1986 | Daly | |
| 4,621,331 A | 11/1986 | Iwata | |
| 4,714,399 A | 12/1987 | Olson | |
| 4,730,862 A | 3/1988 | Caen et al. | |
| 4,742,468 A | 5/1988 | Ohashi et al. | |
| 4,783,106 A | 11/1988 | Nutter | |
| 4,957,408 A | * 9/1990 | Ohkura | 414/642 X |
| 5,292,219 A | 3/1994 | Merin et al. | |
| 5,417,464 A | 5/1995 | Seaberg et al. | |
| 5,738,187 A | 4/1998 | Dammeyer et al. | |

FOREIGN PATENT DOCUMENTS

| | | | |
|---|---|---|---|
| DE | 2636473 | 2/1978 | |
| DE | 3245715 | 9/1983 | |
| GB | 2312417 | 10/1997 | |
| JP | 6-144795 | 5/1994 | |
| WO | WO 79/00330 | * 6/1979 | ............ 414/642 |

OTHER PUBLICATIONS

Auramo, "Mast Centralization System For Lift Trucks," at least as early as 1996.

* cited by examiner

*Primary Examiner*—James W. Keenan
(74) *Attorney, Agent, or Firm*—Chernoff, Vilhauer, McClung & Stenzel

(57) ABSTRACT

A fluid power load-clamping system includes at least one fluid valve for variably regulating the maximum fluid pressure causing closure of the clamp. Preferably the valve increases the maximum fluid pressure automatically in relation to the measured magnitude of the weight of the load to regulate the load-gripping force. A controller causes the valve to permit a relatively high maximum fluid pressure as the clamp closes toward the load to enable high initial clamp closure speed. Thereafter the valve automatically reduces the maximum pressure as the clamping surfaces close into a predetermined relationship with the load, and then increases the maximum pressure to regulate the gripping force. Other preferable features include an automatic limit on the rate of lift of the load during weighing, and compensation of the weight measurement for the longitudinally-extensible position of the lifting mechanism, to maximize the accuracy of the load-weight measurement. Automatic gripping pressure regulation is selectively operable in response to actuation of the lifting mechanism, which can be either a linear lifting mechanism or a tilting lifting mechanism, or both. Different predetermined relationships between the weight of the load and the maximum gripping pressure are selectable alternatively. A gravity-referenced tilt controller adjusts the load automatically to an attitude which is untilted with respect to gravity.

1 Claim, 8 Drawing Sheets

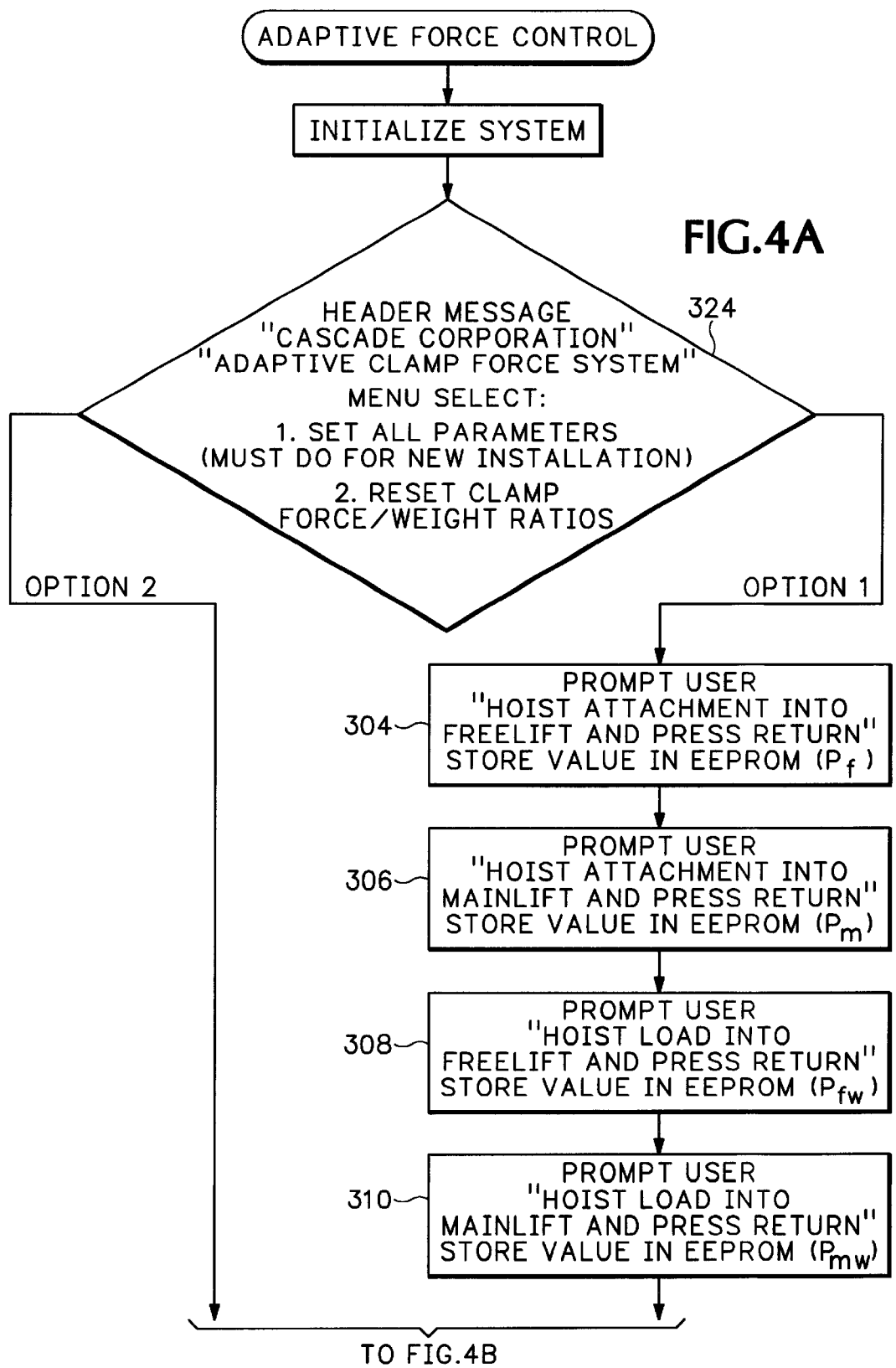

ADAPTIVE LOAD-CLAMPING SYSTEM

BACKGROUND OF THE INVENTION

The present invention relates to improvements in fluid power load-clamping systems for variably regulating maximum load gripping forces in a manner automatically adaptive to at least one characteristic of the load.

Various types of such adaptive load-clamping systems have been proposed in the past. Such previous systems can be categorized as follows:

(1) Systems which sense the existence of load slippage and respond automatically by gradually increasing the gripping force on the load by fixed force increments until the sensed slippage stops;

(2) Systems which automatically vary the gripping force in proportion either to the sensed weight or to the resistance to gripping of the load, without regard to whether or not slippage is actually occurring; and (3) Systems which perform a combination of (1) and (2).

Fluid power clamping systems of any of the above types regulate gripping force by gradually increasing gripping fluid pressure automatically from a relatively low threshold pressure. However such low threshold pressure limits the speed with which the load-engaging surfaces can be closed into initial contact with the load, thereby limiting the productivity of the load-clamping system. This problem occurs because highspeed closure requires higher closing pressures than the desired low threshold pressure, such higher pressures becoming trapped in the system by fluid input check valves during initial closure so that the desired lower threshold pressure is exceeded before automatic regulation of gripping pressure can begin. Although gripping pressure relief valve systems have in the past provided high and low relief settings selectable either manually, or automatically in response to clamp closure speed, to enable high-speed closure followed by low maximum gripping pressure, no such systems capable of automatically changing such settings in a manner compatible with automatic variable gripping pressure regulation have been known.

Prior fluid power systems such as those disclosed in British Patent Publication No. 2312417 and German Patent Publication No. 3245715, which vary the gripping fluid pressure in proportion to the sensed weight of the load, obtain weight measurements by lifting the load. However such weight-sensing systems are susceptible to inaccurate weight measurements due to variations in the speed with which the load is raised during weighing. The system shown in the British publication is also susceptible to inaccurate weight measurements due to variations in lifting pressure which are inherent within the extensible lifting mechanism depending upon its degree of extension. Furthermore, such prior systems do not weigh the load in response to tilting of the load which, in the operation of industrial lift trucks and especially in paper roll handling operations, is a commonly-used alternative way to lift the load.

Prior fluid power weight-responsive gripping pressure regulation systems normally make such pressure regulation responsive to clamp closure actuation. However, particularly for systems on industrial lift trucks, lifting and weighing the load in response to clamp closure actuation is counterintuitive and confusing for the operator, who is accustomed to lifting the load in response to a lifting actuator.

Such prior weight-responsive systems also do not provide for different selectable predetermined relationships between the weight of the load and the gripping pressure, which are needed to account for variations in load fragility and stability.

Although automatic load tilt adjustment systems have been provided in the past for leveling fragile loads to prevent edge damage when the load is being set down, such automatic adjustment systems have not been capable of sensing the tilt of the load with respect to gravity, leading to inaccurate automatic tilt adjustment when an industrial lift truck is not level with respect to its supporting surface, or such surface is not level.

Valves for automatically preventing excessive lowering of the lifting mechanism when a clamped load is set down, to prevent subsequent damage to fragile load surfaces by downward slippage of the clamp when it is opened to disengage the load, have been provided in the past as shown, for example, in U.S. Pat. No. 3,438,308. However, such previous systems lack the versatility needed for reliable protection of the load under variable circumstances, such as variations in the degree of extension of the lifting mechanism when the load is set down.

BRIEF SUMMARY OF THE INVENTION

In one preferred aspect of the invention, a controller automatically enables high initial clamp closure speed prior to automatic gripping pressure regulation by initially permitting relatively high fluid pressure to close the clamp, followed by an automatic reduction in the maximum fluid pressure as the clamping surfaces close into a predetermined relationship with the load, followed by an increase in the maximum fluid pressure pursuant to automatic maximum gripping pressure regulation.

In another separate preferred aspect of the invention, a limit on the rate of lift of the load is automatically imposed during weighing, to maximize the accuracy of the load-weight measurement.

In another separate preferred aspect of the invention, the load-weight measurement is compensated to account for variations in extension of the lifting mechanism, also to maximize the accuracy of the load-weight measurement.

In another separate preferred aspect of the invention, automatic gripping pressure regulation is selectively operable in response to actuation of a lift selector.

In another separate preferred aspect of the invention, automatic gripping pressure regulation is selectively operable in response to actuation of a tilt selector.

In another separate preferred aspect of the invention, different predetermined relationships between the weight of the load and the maximum gripping pressure are selectable alternatively.

In another separate preferred aspect of the invention, a gravity-referenced tilt controller automatically adjusts the load to an attitude which is untilted with respect to gravity.

In another separate preferred aspect of the invention, an improved system is provided for automatically preventing further lowering of the lifting mechanism when the load is set down, until the clamp has been opened to disengage the load.

The foregoing and other objectives, features, and advantages of the invention will be more readily understood upon consideration of the following detailed description, taken in conjunction with the accompanying drawings.

BRIEF DESCRIPTION OF THE SEVERAL VIEWS OF THE DRAWINGS

FIGS. 4A–4F are an exemplary simplified logic flow diagram of an initialization sequence, a load clamping sequence, and a disengagement sequence utilized by the microprocessor-based controller in the circuit of FIG. 3.

DETAILED DESCRIPTION OF THE PREFERRED EMBODIMENT

Figure 1:
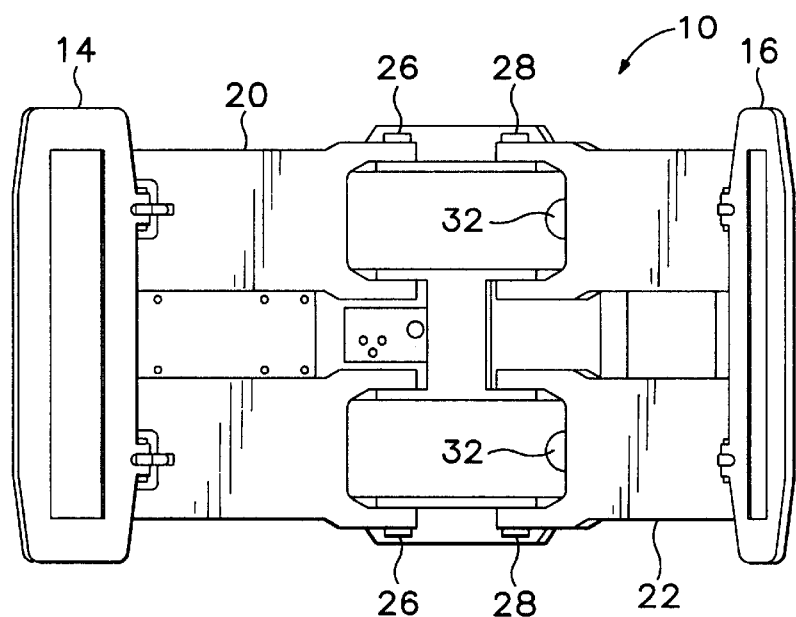
FIG. 1 is a front view of an exemplary embodiment of a fluid-powered load-handling clamp in accordance with the present invention.
Figure 2:
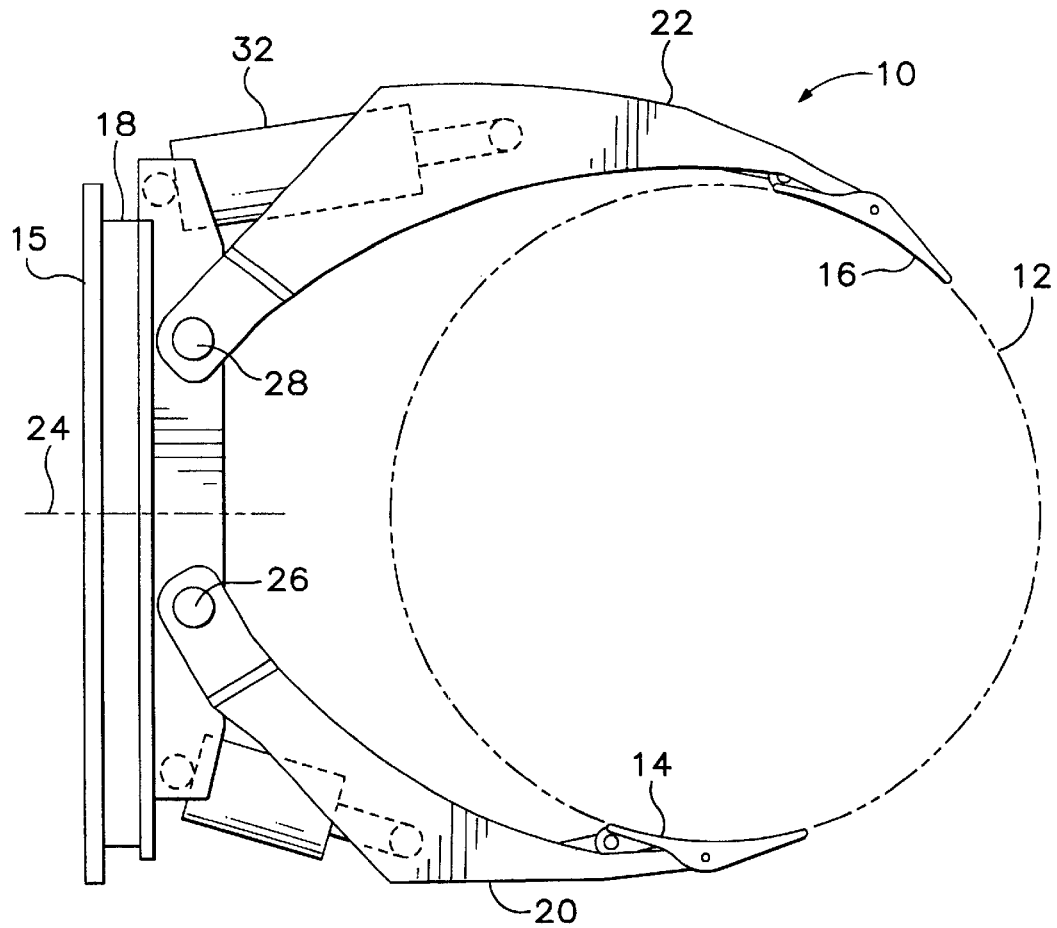
FIG. 2 is a top view of the load-handling clamp of FIG. 1.

An exemplary embodiment of a load-handling clamp in accordance with the present invention is indicated generally as 10 in FIGS. 1 and 2. The exemplary clamp 10 is a hydraulically-powered, pivoted-arm clamp having a base 15 adapted for mounting on a lift truck carriage which is selectively reciprocated linearly along an upright hydraulically-powered load-lifting mast indicated schematically as 11 in FIG. 3. The mast is selectively tiltable forwardly and rearwardly by a pair of tilt cylinders such as 13 in FIG. 3. The particular clamp 10 depicted in the drawings is for handling large paper rolls such as 12 in FIG. 2 used in the publishing and paper industries which, if deformed excessively as a result of overclamping to prevent slippage, will become too dynamically imbalanced for use on the highspeed printing presses or other machinery for which they are intended. On the other hand, under-clamping can cause the paper roll 12 to slip from the frictional grasp of the clamp 10, particularly when the load-engaging surfaces 14 and 16 of the clamp 10 are oriented vertically by the clamp's rotator 18 which rotates the respective clamp arms 20 and 22 relative to the base frame 15 about an axis 24 (FIG. 2). Although the hydraulically-operated paper roll clamp 10 is described herein as the preferred embodiment, the present invention is also applicable to many other types of load clamps. For example, clamps in accordance with the present invention could alternatively have sliding rather than pivoted arms, and could handle rectilinear rather than round loads.

Each of the clamp arms 20 and 22 is rotatable about its respective pivot pins 26, 28 selectively toward or away from the other clamp arm by the selective extension or retraction of respective pairs of hydraulic cylinders 30 and 32 associated with the respective arms 20 and 22. The cylinders 30 which actuate the shorter clamp arm 20 are primarily used only to position the clamp arm 20 in advance for carrying rolls 12 of different diameters and different desired lateral positions. Therefore, closure of the clamp arms and their load-engaging surfaces to grip the load is normally accomplished solely by movement of the clamp arm 22 in response to extension of the cylinders 32. In some clamps, the shorter clamp arm 20 could be fixed, and the cylinders 30 eliminated. In other clamps, particularly those with sliding arms, closure would normally be accomplished by moving both clamp arms simultaneously toward each other. Moreover, closure may be caused by retraction of cylinders instead of extension thereof.

Figure 3:
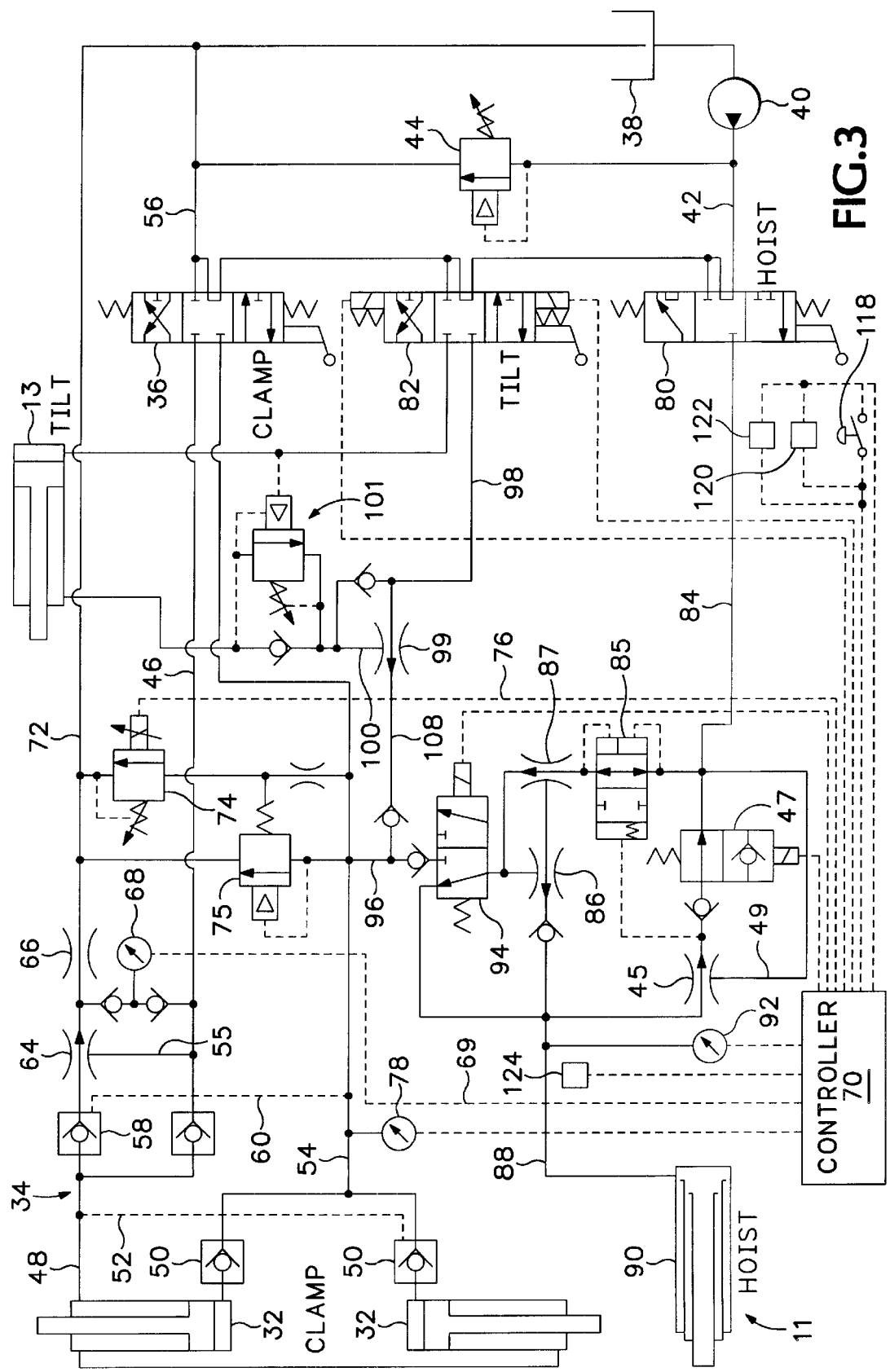
FIG. 3 is a schematic diagram of an exemplary electro-hydraulic circuit for the clamp of FIG. 1.

With reference to FIG. 3, hydraulic clamping cylinders 32 are controlled through hydraulic circuitry indicated generally as 34 to receive pressurized hydraulic fluid from the lift truck's reservoir 38 through a pump 40 and supply conduit 42. Safety relief valve 44 opens to shunt fluid back to the reservoir 38 if excessive pressure develops in the system. The main clamp control valve 36 is controlled selectively by the operator to cause the cylinders 32 to open the clamp arms and to close the clamp arms into initial contact with the load 12.

To open the clamp arms, the spool of the valve 36 is moved downwardly in FIG. 3 so that pressurized fluid in line 42 is conducted through lines 46 and 48 to the rod ends of cylinders 32, thereby retracting the cylinders 32 and moving the clamp arm 22 away from the clamp arm 20. Pilot-operated check valves 50 are opened by the pressure in line 48 communicated through pilot line 52, enabling fluid to be exhausted from the piston ends of cylinders 32 through lines 54 and 56 to the reservoir 38 as the cylinders 32 retract.

To close the clamp arms initially, the spool of the valve 36 is moved upwardly in FIG. 3 so that pressurized fluid in line 42 is conducted through line 54 to the piston ends of cylinders 32, thereby extending the cylinders 32 and moving the clamp arm 22 toward the clamp arm 20. Pilot-operated check valve 58 is opened by the pressure in line 54 communicated through pilot line 60, enabling fluid to be exhausted from the rod ends of cylinders 32 through line 48 as the cylinders 32 extend. A priority portion of the exhausted fluid flows through a restrictor 64 and through a volumetric flow measurement assembly consisting of a restrictor 66 and a pressure sensor 68. The sensor 68 produces an electrical signal representative of the priority volumetric flow rate, which signal is fed to a microprocessor-based controller 70 by a signal line 69. The priority flow through the restrictor 66 is exhausted through line 72 to the reservoir 38. Excess flow is exhausted from the restrictor 64 to the reservoir through lines 45, 46 and 56 via the valve 36.

During closure of the clamp arms by extension of the cylinders 32, the maximum closing pressure in the line 54 is preferably regulated by a pilot controlled modulating pressure regulator valve assembly 75 of which the pilot control is by automatically-variable relief valve assembly 74. The variable relief valve assembly 74 preferably comprises a single relief valve whose relief setting is infinitely proportional to a variable signal received from the controller 70 through signal line 76. Alternatively, the maximum closing pressure could be regulated by single or multiple relief valve and/or regulator valve assemblies with different settings automatically selectable by a signal from the controller 70, or by an automatically-variable pressure-reducing valve assembly having one or more pressure-reducing valves in series with line 54 whose output pressure settings are variably regulated by the controller 70.

Figure 4B:
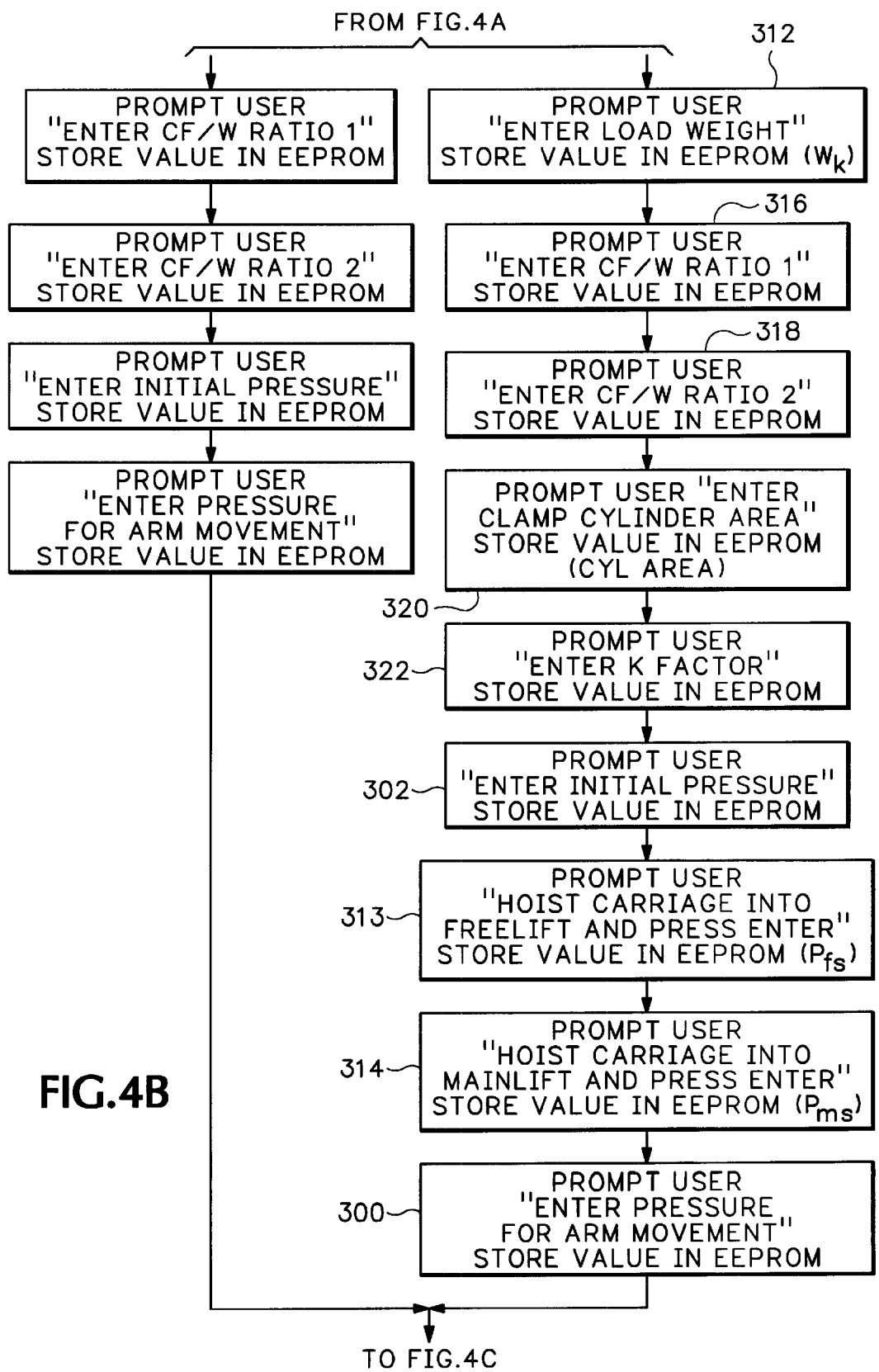
Figure 4C:
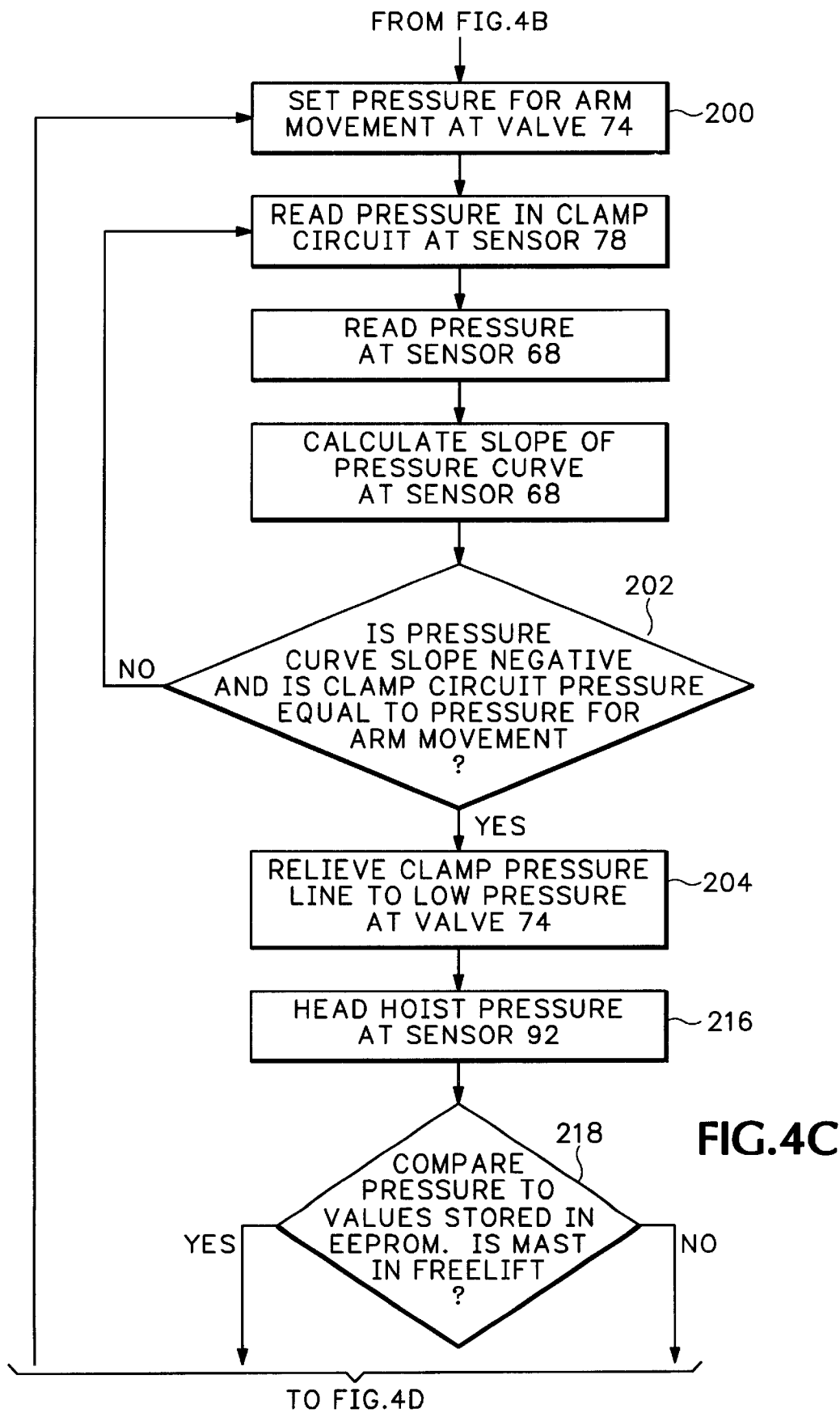
Figure 4D:
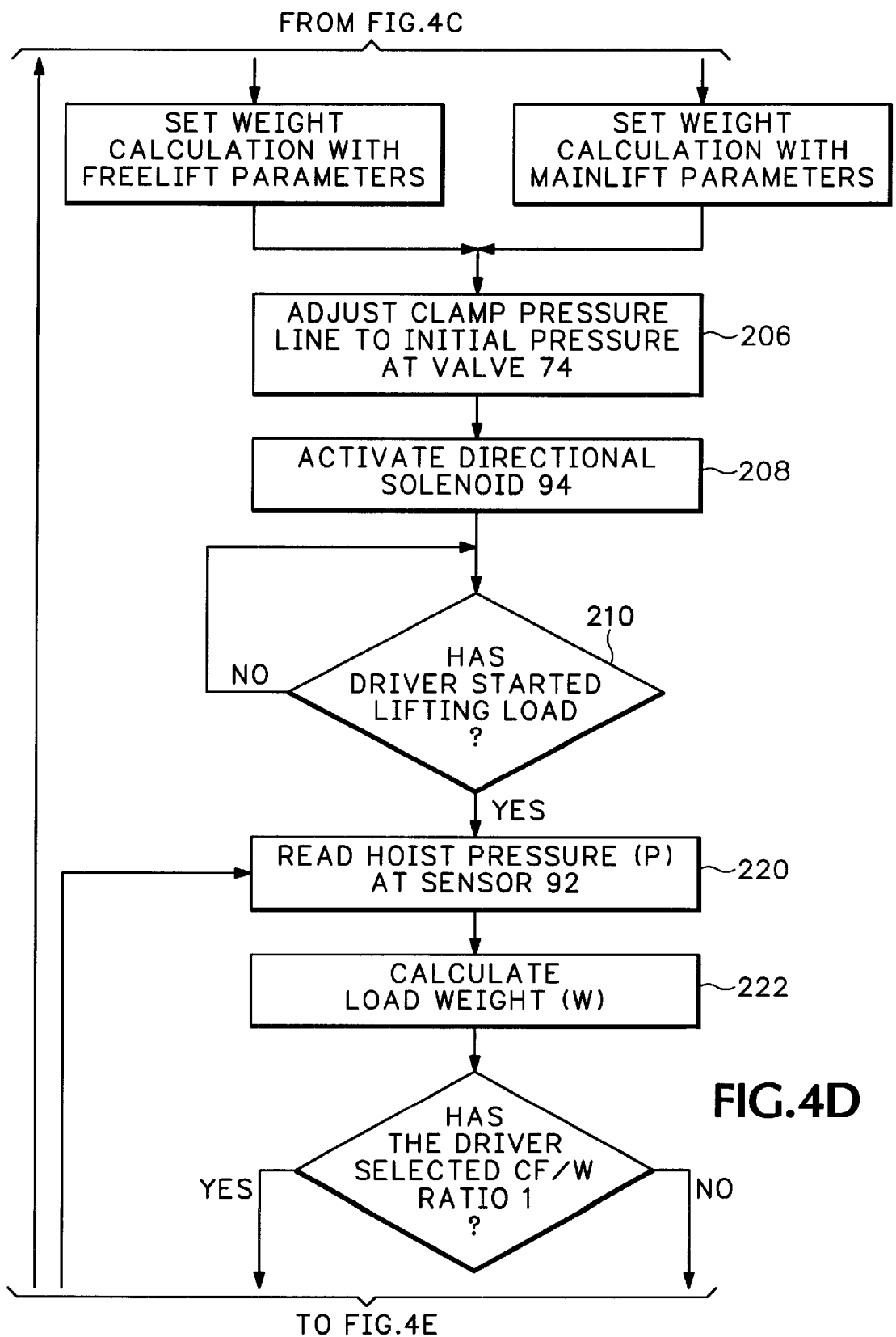
Figure 4E:
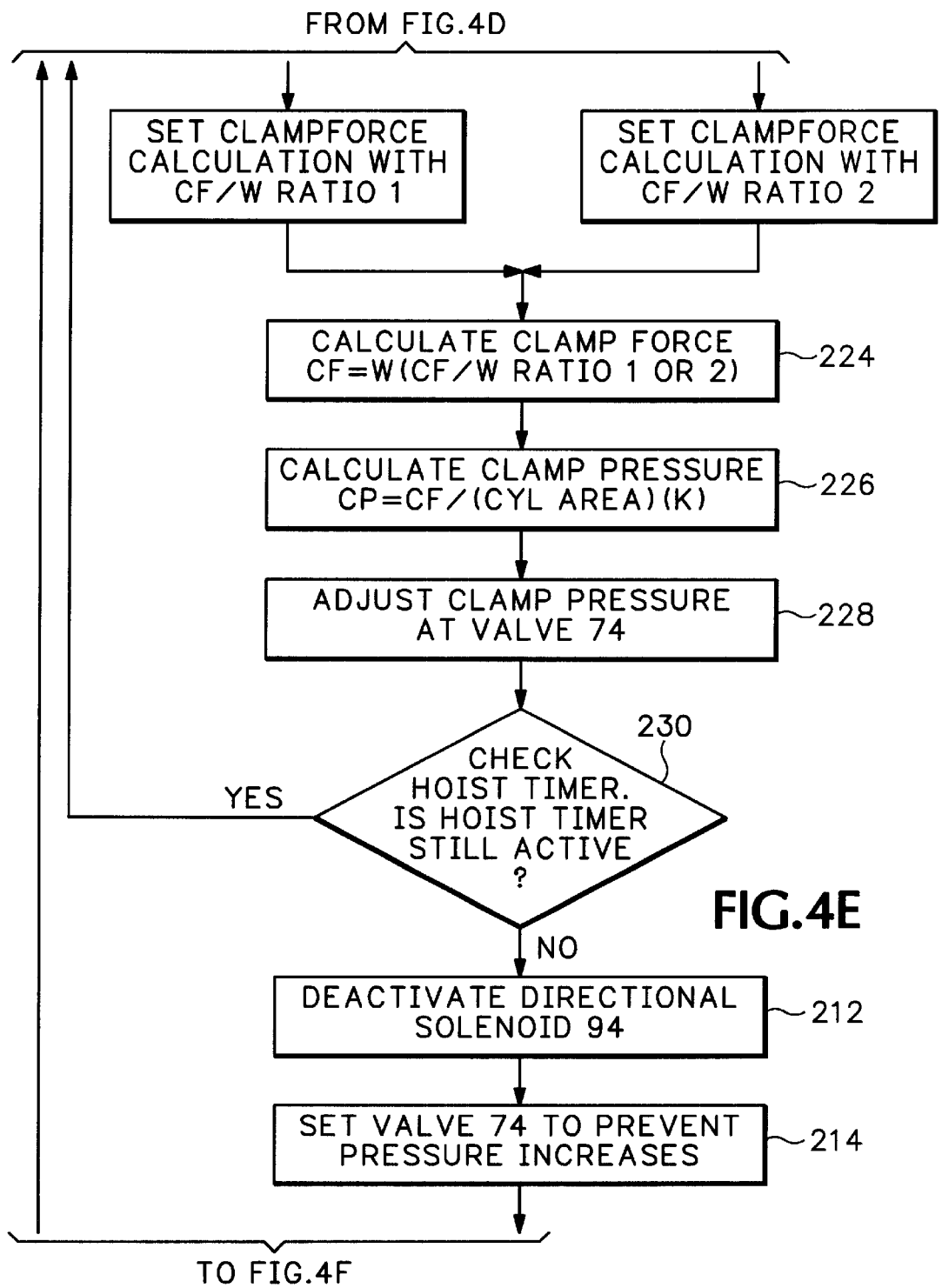

As the clamp arms are closed toward the load, the controller 70 operates in accordance with the steps of FIGS. 4C–4E, and in accordance with the initialization values previously entered into the controller 70 by the operator pursuant to FIGS. 4A and 4B using keyboard switches such as 118. Appropriate portions of these figures will be referenced in the following operational description of the clamp.

During initial clamp arm closure, the controller 70 sets the variable relief pressure of the valve assembly 74, as indicated at step 200 of FIG. 4C, at a relatively high level previously selected by the operator at step 300 of the initialization sequence of FIG. 4B. Such pressure level, for example 1600 psi, enables high-speed closure of the clamp arms toward the load prior to actually gripping the load. Thereafter, in response to contact of the load-engaging surfaces of the clamp arms with the load, the clamp-closing pressure in line 54 as sensed by pressure sensor 78 increases to the foregoing pressure level, while the volumetric flow rate through restrictor 66 decreases resulting in a decrease (i.e. negative slope) of the pressure reading by the pressure sensor 68. In response to such changes in both of these pressure sensor readings reflecting a predetermined resistance by the load to further closure of the arms, the controller 70 immediately reduces the relief setting of the relief valve assembly 74 to a relatively low level, for example 350 psi, for approximately one second as indicated at steps 202 and 204 of FIG. 4C. This temporarily decreases the pressure, between the pilot-operated check valves 50 and the cylinders 32, to the reduced relief setting so that the high-speed initial closing pressure is not maintained between the check valves 50 and the cylinders 32. Such reduced pressure is at or below the desired initial threshold gripping pressure previously selected by the operator at step 302 of the initialization sequence of FIG. 4B, from which subsequent increases in gripping pressure will be automatically regulated as described below. Preferably the reduced pressure is below the desired initial threshold gripping pressure so that, after the controller 70 causes the above-described temporary pressure reduction, it then raises the relief setting of the valve assembly 74 at step 206 of FIG. 4D to enable a desired maximum threshold gripping pressure of, for example, 800 psi.

Instead of reducing the closing pressure in response to load resistance as described, other predetermined relationships between the load and the load-engaging surfaces could trigger the pressure reduction, such as a predetermined proximity therebetween.

Having adjusted the relief setting of valve assembly 74 to enable the desired threshold gripping pressure at step 206, the controller 70 actuates solenoid valve 94 by moving its spool to the left as indicated at step 208 of FIG. 4D. Meanwhile, the operator moves the valve 36 to its centered, unactuated position and begins to lift the load, either by manually actuating the hoist-control valve 80 to move the load linearly upward, or by manually actuating the tilt control valve 82 to tilt the load rearwardly.

In the case of the hoist valve 80, its spool is moved upwardly to lift the load and downwardly to lower the load as seen in FIG. 3. When the valve 80 is actuated to lift the load, the valve 80 conducts pressurized fluid from line 42 through line 84, normally open logic valve 85, the excess flow outlet of priority restrictor 87, lift speed restrictor 86, and line 88 to the base of one or more hoist cylinders, schematically indicated as 90, of the mast 11. A pressure sensor 92 senses a resultant increase in pressure in line 88 and signals the controller 70 that lifting has begun, as indicated at step 210 of FIG. 4D. Simultaneously, the priority flow through restrictor 87 is conducted to line 96 through the actuated solenoid valve 94, and thus through line 54 to the cylinders 32 to further close the clamp arms.

During a load-weighing period extending for the first one or two seconds after the initiation of lift, the controller 70 senses the magnitude of the weight of the load through the signal from the pressure sensor 92, and adjusts the relief setting of the valve assembly 74 upwardly proportionally to the sensed magnitude of the load weight in a manner to be explained more fully hereafter. This increases the maximum fluid gripping pressure in line 54 in proportion to the magnitude of the load weight. Meanwhile the restrictor 86 functions as a time-rate controller which limits the lift speed to minimize dynamic effects on the load-weight measurement and thereby maximizes the accuracy of such measurement.

After such one or two second load-weighing period, the controller 70 deactivates the solenoid valve 94 as indicated at step 212 of FIG. 4E, moving the spool of the valve to the right in FIG. 3 so that automatic gripping pressure regulation ceases while, simultaneously, all of the flow in line 84 is conducted to line 88 so that full lifting speed is obtainable.

Thereafter the valve 74 is set by the controller 70 to prevent any further gripping pressure increases which might otherwise result from the operator's manipulation of valve 36, as indicated by step 214 in FIG. 4E.

Alternatively, the operator's manual actuation of the tilt control valve 82 to lift the load, by moving the spool upwardly in FIG. 3, can also initiate the foregoing load-weighing and pressure-regulating operation. Such actuation of the valve 82 conducts pressurized fluid from line 42 to line 98 and to priority flow restrictor 99, from which priority flow is conducted through line 108, line 96 and line 54 to further close the clamp arms. Meanwhile, excess flow is conducted through line 100, freeflowing through counterbalance valve assembly 101, into the rod ends of the mast tilt cylinders such as 13, thereby causing them to tilt the mast 11 rearwardly to lift the load. In response to an increase in pressure sensed by pressure sensor 92 due to lifting of the load by tilting, the controller 70 automatically regulates the maximum gripping pressure in proportion to the weight of the load by its variable control of the proportional relief valve assembly 74, similarly to the hoist-initiated pressure regulation described in the previous paragraph. Although a further solenoid valve such as 94 could be used in the tilt circuit for tilt-initiated load-weighing and pressure regulation, tilt speed and flow in the tilt circuit are lower than in the hoist circuit and therefore the valve 94 may be omitted if desired.

It will be recognized that sensors other than fluid pressure sensors could be used in place of sensors 68, 78 and 92. For example, an electrical flow meter could be substituted for sensor 68 and restrictor 66. Or electromechanical sensors could be substituted for sensors 78 and 92, sensing mechanical forces proportional to the variables which are to be measured.

In addition to enhancing the accuracy of the load-weight measurement by using the restrictor 86 to limit the time rate at which the mast 11 lifts the load during weighing, such accuracy is also enhanced by compensating for variations in extension of the mast 11 which vary the pressure reading of the sensor 92. Such pressure variations can result from multiple causes, such as changes in effective pressure areas of the hoist cylinder or cylinders 90, or the fact that telescopic sections of the mast 11 may or may not be supported by the hoist cylinder or cylinders 90, depending upon whether the mast is in its lower "freelift" range of extension or in its higher "mainlift" range of extension. To account for these variables, as well as variables in the load-handling clamps that might be mounted interchangeably on the mast, the controller 70 is initialized according to FIGS. 4A and 4B to calibrate the load-weighing system with respect to such variables. Such initialization includes reading and storing the respective pressures sensed by the sensor 92 in both the freelift and mainlift ranges of extension of the mast while dynamically lifting the load-handling clamp, both without a load as shown in steps 304 and 306 of FIG. 4A to obtain $P_f$ and $P_m$ respectively, and with a load of known weight as shown in steps 308 and 310 to obtain $P_{fw}$ and $P_{mw}$ respectively. The controller 70 also reads respective pressures $P_{fs}$ and $P_{ms}$ sensed by sensor 92 with no load in the freelift and mainlift ranges, respectively, under static conditions, i.e. in the absence of dynamic lifting, and stores the pressures as indicated at steps 313 and 314 of FIG. 4B. Furthermore, the controller stores the known load weight $W_k$ as indicated at step 312 in response to operator entry using keyboard switches such as 118. Other operator entries using keyboard switches include one or more desired clamp-force-to-load-weight ratios CF/W ratio 1, CF/W ratio 2, etc., as indicated at steps 316 and 318, the total effective pressure area CYL AREA of the combined clamping cylinders 32 as indicated at step 320, and the efficiency percentage K of the clamp cylinders 32 as indicated at step 322. Such efficiency K equals the ratio of the clamp force generated by the load-engaging surfaces 16 (after frictional and other mechanical losses) to the product of the CYL AREA and the applied fluid pressure.

As indicated at step 324 at the beginning of the initialization process of FIG. 4A, all of the foregoing parameters need be entered only for new installations or changes of load-handling clamps or masts. Otherwise, only the shorter list of entries designated as "Option 2" in FIG. 4 need be entered, or no entries if the operator does not wish to change any listed parameter.

Returning to the load-clamping sequence of FIGS. 4C–4E, the controller 70 controls the load-weight measurement and gripping pressure regulation processes by automatically accounting for the range of extension of the mast 11 (freelift or mainlift), different desired clamp-force-to-load-weight ratios, and the other variables mentioned in connection with FIGS. 4A and 4B. Immediately after clamp pressure is relieved at step 204 of FIG. 4C, the lifting pressure (if any) in the line 88 to the mast 11, which is then unloaded and static, is indicated by pressure sensor 92 and read at step 216 of FIG. 4C. Such pressure is compared to the static unloaded lifting pressure $P_{ms}$ previously stored at step 314 of FIG. 4B. If the pressure read at step 216 of FIG. 4C is less than the pressure $P_{ms}$ previously stored at step 314, the controller 70 determines at step 218 of FIG. 4C that the mast is in its lower, or freelift, range of extension; otherwise the controller determines that the mast is in its higher, or mainlift, range of extension. Depending on such determination, the controller 70 sets the future load-weight calculation with parameters appropriate either for the freelift range of extension or the mainlift range of extension of the mast. After setting the initial threshold gripping pressure at step 206 of FIG. 4D, the actuation of solenoid 94 at step 208, and the operator's lifting of the load by actuation of the hoist valve 80 or the tilt valve 82 as previously described, the controller reads the lifting pressure P sensed by pressure sensor 92 as indicated at step 220, and at step 222 calculates therefrom the load weight W using the appropriate freelift or mainlift calculation.

For the freelift range of extension of the mast 11, the calculation is as follows:

$$W = \frac{(P - P_f)(W_k)}{(P_{fw} - P_f)}$$

For the mainlift range of extension of the mast 11, the calculation is as follows:

$$W = \frac{(P - P_m)(W_k)}{(P_{mw} - P_m)}$$

In the foregoing calculations, $P_f$ and $P_m$ are the values which were previously entered during steps 304 and 306, respectively, of the initialization sequence of FIG. 4A, while $P_{fw}$ and $P_{mw}$ are the values previously entered during steps 308 and 310. $W_k$ is the weight of the known load used during initialization and previously entered at step 312 of the initialization sequence.

After calculation of the load weight W at step 222 of FIG. 4D, the controller determines which predetermined clamp-force-to-load-weight ratio has been selected by the operator using a selector mechanism such as a keyboard switch 118, and determines the desired maximum clamp force CF in step 224 of FIG. 4E by the equation:

$$CF = W(CF/W \text{ ratio1 or 2}).$$

Having determined the desired maximum clamp force CF at step 224, the controller 70 then calculates the maximum fluid gripping pressure CP at step 226 by the equation:

$$CP = CF/(CYL \text{ AREA})(K).$$

At step 228 the controller then adjusts the maximum pressure relief setting of valve 74 to the desired maximum fluid gripping pressure CP. This process repeats continuously for one or two seconds as indicated at step 230. The controller 74 then deactivates the solenoid 94 and sets the valve 74 to prevent pressure increases as described previously until sensing, at step 232 of FIG. 4F, a decrease in the gripping pressure sensed by a pressure rise at sensor 68 indicating that the operator has opened the clamp arms. Thereafter, the load clamping sequence returns to its origin at step 200 of FIG. 4C where the relief pressure of valve 74 is reset at the relatively high level needed for high-speed closure, as described previously.

Instead of manual keyboard selections of different clamp-force-to-load-weight ratios at steps 316 and 318 of FIG. 4B, or different initial threshold gripping pressures at step 302, different relationships between maximum gripping pressure and load weight to account for differences in fragility or stability of the load can be selected automatically in response to an electronic code reader 120 which senses characteristics of a load by reading a coded label on the load. Such variable relationships can also be selected automatically by a proximity sensor 122 which senses the distance between the load-engaging surfaces of the clamp arms to determine the size of the load being gripped. Accordingly, different types of predetermined relationships between fluid gripping pressure and load characteristics are contemplated by the present invention, as well as different types of mechanisms for selecting such different relationships.

To minimize the possibility of setting a fragile load down onto a supporting surface in a tilted attitude such that the edge of the load would be damaged, a gravity-referenced tilt sensor 124 is preferably mounted on the base frame 15 of the clamp 10 to determine whether or not the load is tilted forwardly or rearwardly with respect to gravity and to cause the controller 70 to automatically adjust the load to a level attitude by corrective solenoid actuation of the tilt control valve 82. Mounting the gravity-referenced tilt sensor 124 on the clamp structure, rather than on the mast 11, allows the sensor to determine whether or not the load is tilted with respect to gravity irrespective of any tilting of the mast 11 due to mast deflection or other factors. The gravity-referenced sensor is also independent of whether or not the lift truck is level with respect to its supporting surface, or whether or not such surface is level. However, despite its foregoing advantages, the gravity-referenced sensor 124 is also susceptible to instability and long settling times if subjected to dynamic disturbances during lift truck travel, such as acceleration or braking, or vertical dynamic disturbances caused by ramps or uneven surfaces. For this reason, the controller 70 actuates the tilt control valve 82 correctively only in response to a decrease in load-weight detected by pressure sensor 92 (i.e. a negative pressure slope) in response to lowering of the load by the mast 11 to set the load down. During such lowering of the load, dynamic disturbances are minimized due to stoppage of the lift truck.

Figure 4F:
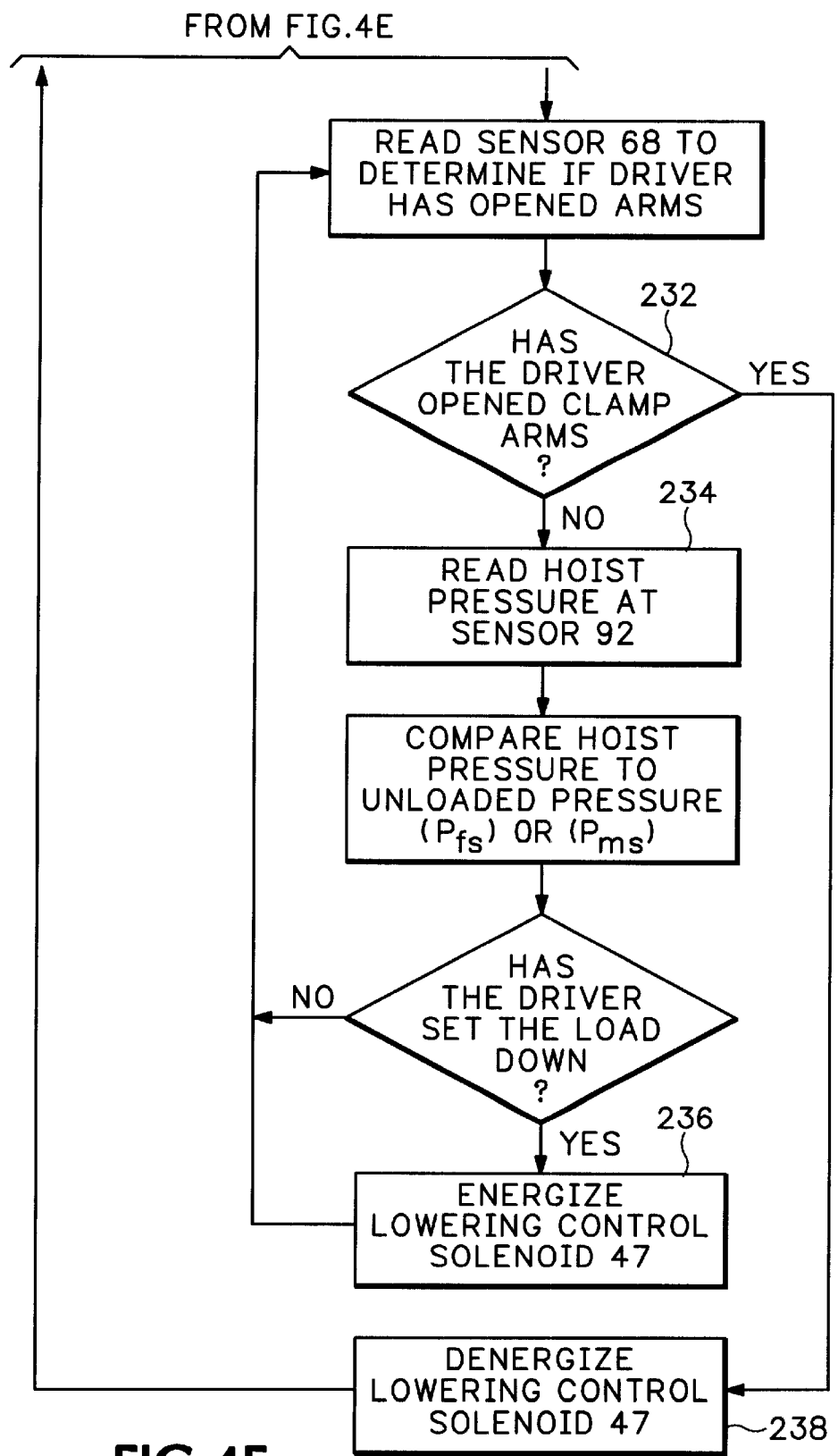

Another problem which can lead to load damage while setting the load down onto a supporting surface is the possibility that the operator may continue to lower the mast 11 after the load has been set down but before the operator has opened the clamp arms. In such case, the chains of the mast which normally support the clamp will become slack because the clamp is then supported by the clamped load rather than the mast. Thereafter, when the operator finally opens the clamp arms to disengage the load, the load engaging surfaces of the clamp arms slide down the surfaces of the load, causing external damage to fragile loads such as paper rolls. To minimize the possibility of such damage a solenoid valve 47 down-stream of a lowering flow restrictor 45 is preferably provided so as to be automatically controlled by the controller 70, in response to the setting down of a clamped load, to prevent further lowering of the mast until after the clamp arms have been opened to disengage the load. In the normal lowering mode, fluid flows through the priority path of the flow restrictor 45, pilots the logic valve 85 to its closed position, and flows through conduit 84 and hoist control valve 80, in its lowering position, through line 56 to the reservoir 38. The priority restrictor 45 is of a design where the priority flow requirements must be satisfied before the restrictor will permit any flow to bypass through its excess flow port and the excess flow conduit 49. With reference to FIG. 4F, when the controller 70 detects through sensor 92 at step 234 that the hoist pressure has declined to a level equal to or less than the unloaded static pressure $P_{fs}$ or $P_{ms}$ previously entered at steps 313 and 314 of FIG. 4B (depending upon whether the mast is in its freelift range or mainlift range as determined at step 218 of FIG. 4C), this indicates that a clamped load has been set down on a supporting surface. Accordingly, the controller 70 activates the solenoid valve 47 at step 236 thereby blocking the priority flow path. Without the priority flow condition being fulfilled, the flow restrictor 45 blocks excess flow from returning to the reservoir alternatively through conduit 49 and thereby prevents the mast from lowering further. When the clamp is subsequently opened, as automatically determined at step 232 by sensing a pressure rise at sensor 68, the controller deactivates the solenoid valve 47 at step 238, and the mast and clamp can thereafter be further lowered by the operator without damaging the load.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A load-clamping system comprising:

(a) a clamp having selectively closable and openable load-engaging surfaces for selectively gripping and releasing a load positioned between said surfaces;

(b) a tilting mechanism operable to tilt said load by tilting said clamp;

(c) a lifting mechanism operable to lift and lower said load by lifting and lowering said clamp;

(d) a gravity-referenced sensor operable to determine whether or not said load is tilted relative to gravity;

(e) a load-lowering sensor operable to determine whether or not said load is being lowered by said lifting mechanism; and (f) a controller selectively operable, automatically in response to lowering of said load by said lifting mechanism as sensed by said load-lowering sensor, to actuate said tilting mechanism to adjust said load to an attitude which is untilted with respect to gravity in response to said gravity-referenced sensor.

* * * * *